United States Patent
Budelsky

(10) Patent No.: US 7,890,093 B2
(45) Date of Patent: Feb. 15, 2011

(54) METHOD FOR TESTING SMS CONNECTIONS IN MOBILE COMMUNICATION SYSTEMS

(75) Inventor: Dietmar Budelsky, Pulheim (DE)

(73) Assignee: T-Mobile Deutschland GmbH, Bonn (DE)

( * ) Notice: Subject to any disclaimer, the term of this patent is extended or adjusted under 35 U.S.C. 154(b) by 790 days.

(21) Appl. No.: 10/543,763

(22) PCT Filed: Jan. 16, 2004

(86) PCT No.: PCT/DE2004/000052
§ 371 (c)(1), (2), (4) Date: Nov. 18, 2005

(87) PCT Pub. No.: WO2004/066654
PCT Pub. Date: Aug. 5, 2004

(65) Prior Publication Data
US 2007/0129089 A1   Jun. 7, 2007

(30) Foreign Application Priority Data
Jan. 17, 2003   (DE)   ................... 103 01 904

(51) Int. Cl.
*H04W 24/00* (2009.01)
(52) U.S. Cl. .................. 455/423; 455/466
(58) Field of Classification Search ........ 455/423, 455/466, 557, 558, 551, 405–408, 418–420; 709/203–207
See application file for complete search history.

(56) References Cited

U.S. PATENT DOCUMENTS

| | | | | |
|---|---|---|---|---|
| 5,870,673 A | * | 2/1999 | Haartsen | 455/466 |
| 6,272,450 B1 | * | 8/2001 | Hill et al. | 703/13 |
| 6,434,364 B1 | * | 8/2002 | O'Riordain | 455/419 |
| 6,625,439 B2 | * | 9/2003 | Laybourn et al. | 455/407 |
| 6,687,499 B1 | * | 2/2004 | Numminen et al. | 455/423 |
| 7,209,737 B2 | * | 4/2007 | Cho | 455/423 |
| 2002/0028659 A1 | * | 3/2002 | Adams et al. | 455/423 |
| 2002/0072358 A1 | * | 6/2002 | Schneider et al. | 455/423 |
| 2002/0103940 A1 | * | 8/2002 | Sullivan et al. | 709/250 |
| 2002/0127996 A1 | * | 9/2002 | Chiu | 455/557 |
| 2002/0142797 A1 | * | 10/2002 | Tarighi et al. | 455/556 |

(Continued)

FOREIGN PATENT DOCUMENTS

DE   10028029   6/2000

(Continued)

OTHER PUBLICATIONS

Rohde&Schwarz, "Universal Protocol Tester R&S CRTU-G", 2002, 7 pages.

(Continued)

*Primary Examiner*—Kamran Afshar
(74) *Attorney, Agent, or Firm*—Cooper & Dunham LLP

(57) ABSTRACT

A method for testing SMS connections in mobile communication systems with automatic interchange of one or more SMS messages or SMS dialogs between a test device and at least one remote location and having complete tabular recording of the SMS message contents and protocols emitted from the test device (MO) and arriving at the test device (MT). The message contents of the incoming and outgoing SMS messages are recorded completely in tabular form.

11 Claims, 2 Drawing Sheets

U.S. PATENT DOCUMENTS

| | | | |
|---|---|---|---|
| 2002/0164977 A1* | 11/2002 | Link, II et al. | 455/414 |
| 2003/0028380 A1* | 2/2003 | Freeland et al. | 704/260 |
| 2003/0028669 A1* | 2/2003 | Batsleer et al. | 709/240 |
| 2003/0115262 A1* | 6/2003 | Dai | 709/203 |
| 2004/0044490 A1 | 3/2004 | Weber | |

FOREIGN PATENT DOCUMENTS

| | | |
|---|---|---|
| DE | 10301904 | 6/2005 |

OTHER PUBLICATIONS

3GPP TS 34.123-1, V5.1.0, (Sep. 2002), Technical Specification, $3^{rd}$ Generation Partnership Project; Technical Specification Group Terminals; User Equipment (UE) conformance specification; Part 1: Protocol conformance specification (Release 5), 2,422 pages, (pp. 2316-2325 were cited in corresponding German application.

* cited by examiner

LOG FILE SMS MO/MT

| Mobile Subcriber Identification IMSI | SIM Identifier | Time Stamp | SMS Direction | SMS Contents including Text |
|---|---|---|---|---|
| ... | ... | ... | ... | ... |
| ... | ... | ... | ... | ... |

Fig. 2

000# METHOD FOR TESTING SMS CONNECTIONS IN MOBILE COMMUNICATION SYSTEMS

CROSS REFERENCE TO RELATED APPLICATIONS

This application is a submission under 35 U.S.C. 371 of PCT International Application No. PCT/DE2004/000052 having an International Filing date of Jan. 16, 2004 and claims priority from German Patent Application 103 01 904.9 filed Jan. 17, 2003, the entire contents of each of which are herein incorporated by reference.

FIELD OF THE DISCLOSURE

The invention relates to a method for testing SMS connections in mobile communication systems.

BACKGROUND OF THE DISCLOSURE

The testing of SMS connections, in particular connections to SMS added value services, requires the repeated, documented entry of formatted SMS inputs. Until now, the SMS inputs have been entered either by means of a mobile communication terminal via its keyboard or keypad or via conventional PC help programs for administration and easier inputting of the SMS messages. Tests with different SIM cards, for example for different contractual relationships or regression tests, have required manual repetition of this process.

The documentation of the messages produced and of the added value response messages was carried out manually on paper lists or by writing down the received SMS contents. In this case, it was only possible to estimate the precise times of reception of the SMS messages.

With the introduction of interactive, no longer static, added value services by means of so-called SMS micropayment methods, the testing of an individual service may comprise several hundred SMS in order to cover the entire service content. In order, for example, to record spelling errors and linguistic errors, the precise text of the responses must be documented. This also applies in particular to the documentation of the corrections made. This could be ensured manually only with a very major time penalty for the large number of new services that are currently being introduced.

Owing to the corresponding documentation effort required, systematic real network tests for checking the current contents of SMS added value services or for correct charging for the new services or already existing services after tariff changes are likewise very time-consuming.

The object of the invention is to specify a method which allows automated, detailed and correct checking of SMS connections in mobile communication systems.

BRIEF DESCRIPTION OF THE DRAWINGS

FIG. 2 is a schematic view of a recorded SMS MO/MT in tabular form according to an embodiment of the present disclosure.

SUMMARY OF THE DISCLOSURE

Figure 1:
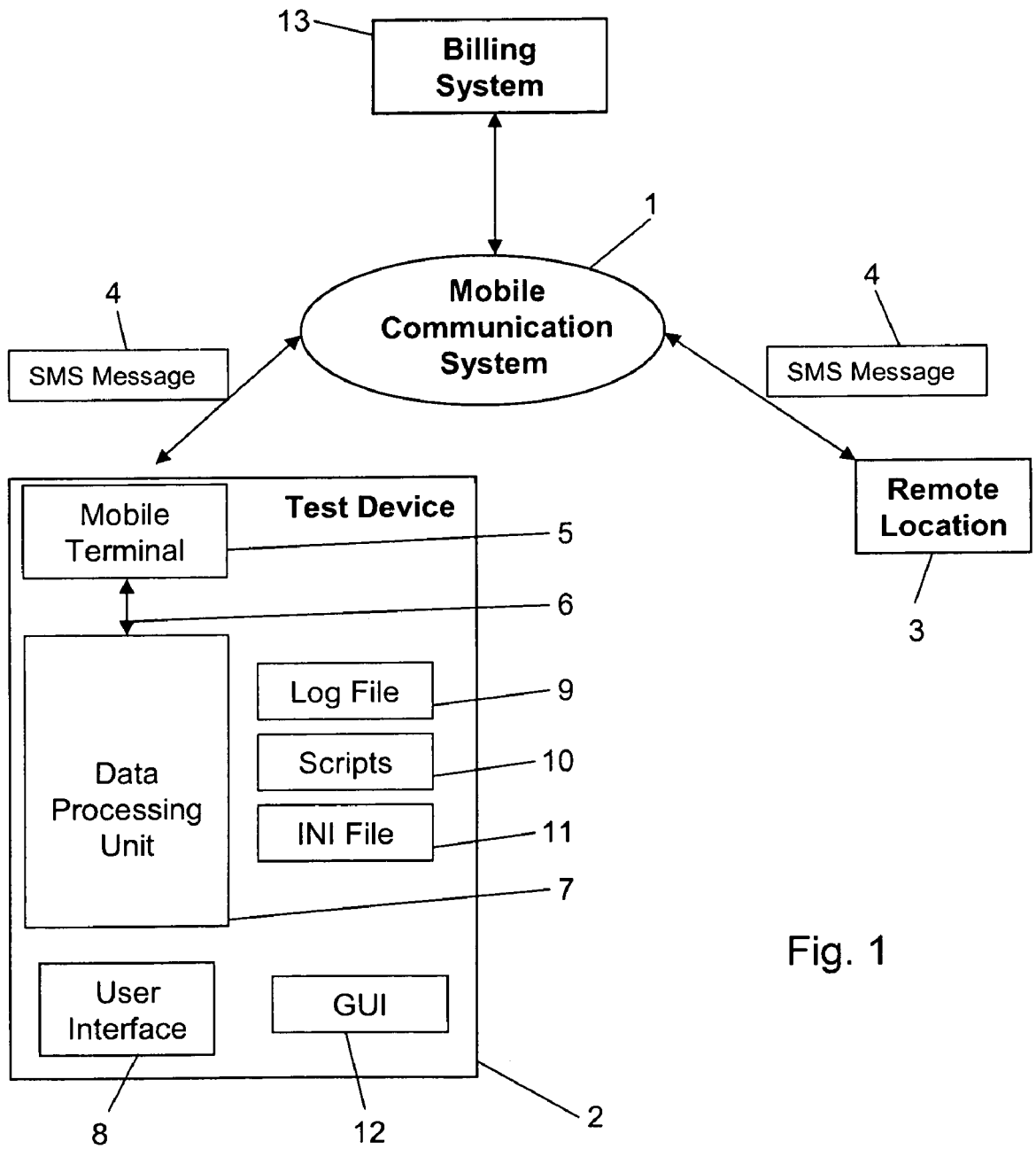
FIG. 1 is a schematic view of a system for carrying out a method according to an embodiment of the present disclosure.

A method for testing SMS connections in mobile communication systems with automatic interchange of one or more SMS messages or SMS dialogs between a test device and at least one remote location and having complete tabular recording of the SMS message contents and protocols emitted from the test device (MO) and arriving at the test device (MT), characterized in that the message contents of the incoming and outgoing SMS messages are recorded completely in tabular form.

DETAILED DESCRIPTION

FIG. 1 shows a mobile communication system 1 to which a test device 2 and at least one remote location 3 are connected. There is an interchange of one or more SMS messages 4 or SMS dialogs between the test device 2 and the remote location 3.

The test device 2 can include a mobile communication terminal 5 which is connected via a standardized data transmission interface 6 to a data processing device 7, such as a Personal Computer (PC).

A user interface 8 allows a user to enter the destination telephone number of the remote location 3 and the desired SMS text and offers the capability to select from the last ten inputs in these data fields.

As shown in FIG. 2, the international mobile subscriber identification, or a SIM identifier, the time stamp of the transmission and/or of the reception of SMS messages, the SMS direction (MO/MT) and the SMS text are recorded automatically in a log file 9, for example a CSV file, in order to make it possible to carry out data evaluation using a suitable data processing program.

The data processing device 7 which is used to carry out the method, and the mobile communication terminal 5 are able to process scripts 10, which are preferably in a powerful and widely used script language. It is thus possible to send and receive SMS messages. The received SMS messages can be investigated for the time, sender and content in order to allow an interactive reaction in the form of outputs on a screen, an output in a (CSV) log file or the sending of further SMS MO.

The user can start the respectively used script interactively via a graphics user interface (GUI) 12 or by command line.

The settings for the log files 9, the script file 10, the mobile terminal 5 that is used, the last messages, the dialed numbers and the interface and program settings are stored in an INI file 11, which can be selected via a command line parameter.

A check of the correct recording of the SMS MO/MT is carried out by operator billing systems 13 in the mobile communication system 1.

According to the invention, complete tabular recording is carried out of the SMS message contents and protocols emitted from the test device (MO: Mobile Originated) and arriving at the test device (MT: Mobile Terminated).

The described method allows the recording of SMS traffic to a greater extent, particularly in the case of SMS-supported added value services, the checking of the correct recording of the SMS MO/MT by the billing systems of a GSM network operator and automatic handling of SMS dialogs for quality control or for SMS traffic that can be made systematic.

The method is carried out using a data processing device, preferably a personal computer (PC) with a standard operating system, which is connected to an SMS-compatible mobile communication terminal via a suitable data transmission interface, for example a series RS 232 interface. The use of a mobile PC or other interfaces is likewise envisaged.

The following text describes a number of functions which are carried out and/or supported by the method.

A user interface allows the user to enter the destination telephone number of the remote location and the desired SMS text and offers the capability to select from the last ten inputs in these data fields.

According to the method, the international mobile subscriber identification, IMSI, or a SIM identifier, the time stamp of the transmission and/or of the reception of SMS messages, the SMS direction (MO/MT) and the SMS text are recorded automatically in a file, for example a comma-separated value (CSV) file, in order to make it possible to carry out data evaluation using a suitable data processing program.

In addition, regular checks are carried out to determine whether the GSM network is still available.

The data processing device which is used to carry out the method and the mobile communication terminal are able to process scripts, which are preferably in a powerful and widely used script language. It is thus possible to send and receive SMS messages. The received SMS messages can be investigated for the time, sender and content in order in this way to allow an interactive reaction in the form of outputs on the screen, an output in a (CSV) log file or the sending of further SMS MO.

The user can start the respectively used script interactively via a graphics user interface (GUI) or by command line.

The settings for the log files, the script file, the mobile terminal that is used, the last messages, the dialed numbers and the interface and program settings are stored in an initialization (INI) file, which can be selected via a command line parameter.

The described method makes it possible to carry out the recording effort for the SMS test completely automatically. The required tests need be configured only once, and can then be carried out automatically and repeatedly. Subsequent regression tests, post tests and real network checks thus now require only a minimal amount of effort.

The method according to the invention for the first time makes it possible to completely check the contents of new added value services.

The invention claimed is:

1. A method for testing short message service (SMS) connections used to communicate text messages in mobile communication systems comprising:
   performing automatic interchange of one or more SMS messages or SMS dialogs between a test device and at least one remote location; and
   making a complete tabular recording of the SMS message contents and protocols emitted from the test device (MO: Mobile Originated) and arriving at the test device (MT: Mobile Terminated), wherein the SMS message contents including the complete text messages themselves of the incoming and outgoing SMS messages are recorded completely in tabular form for subsequent analysis of the incoming and outgoing SMS messages.

2. The method as claimed in claim 1, characterized in that the SMS message interchange is based on computer-controlled scripts.

3. The method as claimed in claim 1, characterized in that the respectively used script is started interactively via a graphics user interface (GUI) or by command line.

4. The method as claimed in claim 1, characterized in that the international mobile subscriber identification (IMSI) or a SIM identifier, a time stamp of the transmission and/or of the reception of the SMS, the SMS direction MO/MT and the SMS contents are recorded in a file.

5. The method as claimed in claim 1, characterized in that the received SMS messages are investigated for time, sender and content and an interactive reaction is produced on the basis of this data, in the form of outputs on a screen, and/or in a log file, and/or by sending further SMS MO.

6. The method as claimed in claim 1, characterized in that the settings for the log files, the script files, the test device that is used, the last SMS messages, the dialed telephone numbers and the interface and program settings are stored in an INI (Initialization) file.

7. The method as claimed in claim 6, characterized in that the INI file can be selected via a command line parameter.

8. The method as claimed in claim 1, characterized in that a check of the correct recording of the SMS MO/MT is carried out by operator billing systems in the mobile communication system.

9. The method as claimed in claim 1, characterized in that the availability of the mobile communication network is checked at regular time intervals.

10. The method as claimed in claim 1, characterized in that a mobile communication terminal which is connected via a standardized data transmission interface to a data processing device is used as the test device.

11. A method for testing contents of added value services by use of short message service (SMS) connections used to communicate text messages in mobile communication systems comprising:
    sending and receiving a plurality of SMS messages in order to cover an entire service content of the added value services under test; and
    making a complete tabular recording of the SMS message contents and protocols emitted from the test device (MO: Mobile Originated) and arriving at the test device (MT: Mobile Terminated), wherein the SMS message contents including the complete text messages themselves of the incoming and outgoing SMS messages are recorded completely in tabular form for subsequent analysis and wherein precise text of a response SMS text message is documented in order to record spelling errors and linguistic errors.

* * * * *